United States Patent [19]

Vetter

[11] Patent Number: 4,880,035

[45] Date of Patent: Nov. 14, 1989

[54] PNEUMATIC BOLSTER FOR SEALING DAMAGED WALLS OF CONTAINERS AND PIPES

[76] Inventor: Manfred Vetter, Burg Langendorf, D-5352 Züpich, Fed. Rep. of Germany

[21] Appl. No.: 196,980

[22] Filed: May 20, 1988

[30] Foreign Application Priority Data

May 20, 1987 [DE] Fed. Rep. of Germany ....... 3716918

[51] Int. Cl.$^4$ .............................................. F16L 55/16
[52] U.S. Cl. ........................................ 138/99; 138/97
[58] Field of Search ............... 138/97, 98, 99; 24/279, 24/280, 281, 282; 206/582; 285/15

[56] References Cited

U.S. PATENT DOCUMENTS

| | | | |
|---|---|---|---|
| 2,795,523 | 6/1957 | Cobb et al. | 138/99 |
| 3,480,043 | 11/1969 | Proudfoot et al. | 138/99 |
| 3,496,963 | 2/1970 | Bandgette et al. | 138/99 |
| 4,202,379 | 5/1980 | Vetter | 138/99 |
| 4,207,918 | 6/1980 | Burns et al. | 138/99 |
| 4,448,218 | 5/1984 | Vetter | 138/99 |
| 4,552,183 | 11/1985 | Chick | 138/97 |

FOREIGN PATENT DOCUMENTS 359219 10/1931 United Kingdom ................. 138/99

Primary Examiner—James E. Bryant, III
Attorney, Agent, or Firm—K. S. Cornaby

[57] ABSTRACT

The leak sealing-pad for sealing off the damaged wall of containers and pipes is constructed from reinforced rubber material which is vulcanized under heat. It has a pad-surface (20) which is faced towards the leak and a pad-surface, equally as large, which faces away from the leak (22), both these surfaces being joined at their edges to form an air-tight inner-chamber (24) which can be accessed externally via a nipple (26). Attachment components (30), loops 54, and bridges 64 are attached to two edge zones which lie opposite each other, the narrow sides 28. These attachments are intended for a tension device which spans the container or pipe. Both the surfaces of the pad (20, 22) have internal reinforcing with bisecting, flexible reinforcing threads (34, 36; 40, 42). The pad-surface which faces toward the leak (20) is reinforced solely with reinforcing threads (34, 36) applied diagonally to the rectangular sides (28, 38) of the pad, while the pad-surface which faces away from the leak (22) has reinforcing threads (40, 42) which run parallel to the rectangular sides (28, 38).

8 Claims, 2 Drawing Sheets

PNEUMATIC BOLSTER FOR SEALING DAMAGED WALLS OF CONTAINERS AND PIPES

BACKGROUND OF THE INVENTION

The invention pertains to a leak sealing-pad for sealing off the damaged walls of containers and pipes. The leak sealing-pad is rectangular in shape and is manufactured in a press using vulcanized rubber, which prior to vulcanization is not reinforced, but which in the process is reinforced and vulcanized by heat. It has a surface which is applied to the leak and an opposing surface which is equally as large and which faces away from the leak. These two surfaces are joined at their edges and thus describe an air-tight inner chamber which can be accessed from outside via a nipple. In addition, there are mounted on two opposite edges hooks, eyes, loops and the like for a device which spans the container or, as the case may be, the pipe.

With the aid of such leak sealing-devices, damaged containers or piping can be sealed off simply and with a minimum of exertion. The devices are of particular value when it is necessary to seal off a leaking section that has been damaged in an accident or the like, the purpose being to stop as quickly as possible the discharge of dangerous substances from containers or pipes in order to keep as minimal as possible resulting damage, especially pollution of the environment or the danger of an explosion.

In a device that is familiar from the U.S. Pat. No. 4,202,379 and can be employed for sealing off damaged walls of the type described above, an inflatable pad is employed. The pad is made from two vulcanized, reinforced rubber or caoutchouc surfaces which are attached to a side of a flexible counter-plate. This device has, like the pad, rectangular shape, although it is larger than the inflatable pad. Inserted in the mutually opposite narrow sides, are metal rods by means of which the attachments are formed. A valve is incorporated as a nipple in the middle of the surface which faces away from the leak. This valve projects through an opening of the counter-plate and is accessible from the outside.

The flexible counter-plate is reinforced by longitudinal reinforcing threads or elements, which run at right-angles to the metal rods and are placed around the metal rods. Compared to a rigid counter plate of the kind familiar from the text of German Registered Utility Model No. DE-GM 19 20 243 concerning sealing devices, the flexible counter-plate has the advantage that it can be accommodated to a quite considerable extent to the curvature of the damaged container or pipe. Thus the pad is pressed uniformly along its entire surface against the damaged section, and the leak-sealing device can be used almost universally and without being limited to special diameters or forms of containers or pipes. For all practical purposes the counter-plate will not expand in the direction of the reinforcing, and it ensures that the pad which is sited under it is pressed evenly and along its entire surface against the wall which is to be sealed. At the same time, it prevents a localized and unreasonable expansion of the pad. The volume which the pad must occupy remains relatively small. This in its turn avoids the danger that the damaged wall will be pressed in (or deformed, that is further damaged) in the vicinity of the leak.

One of the disadvantages of the leak-sealing devices already on the market is the rather complicated manufacture of the actual sealing arrangement using a counter plate and an inflatable pad. Reinforcing the counter plate in just one direction, namely the direction of pull of the tension devices, has its disadvantages, because the counter plate by reason of the absence of reinforcing can be more easily stretched in the direction at right-angles to the reinforcing. This results in unevenness in its stretching properties. To manufacture the leak sealing-device out of two separate component parts is also a tedious matter. In addition, such a method of manufacture also increases the weight.

Taking as its starting point the leak sealing-devices which are already on the market and which are described in the opening section of this paper, it was the purpose of the invention to avoid the disadvantages of this type of leak-sealing pad and to develop and improve the sealing-device by (1) having the counter plate and the pad constitute one piece right from the initial stage of manufacture, (2) having the pad-surface that is placed against the leak as flexible as possible even after reinforcing so that it can assume a convex shape when inflated, while (3) the pad-surface which faces away from the leak is deformed as little as possible in spite of its reinforcing and its flexibility.

DESCRIPTION OF THE INVENTION

Proceeding from the familiar sealing-devices, these results were achieved by giving each surface of the pad on its internal surface reinforcing in the form of two flexible, linear reinforcing elements (polyamide, polyester, aramide or the like) which bisect each other; and siting the reinforcing strips (elements) of the surface which is placed against the leak at an angle of 30° to 45° to the right-angled sides. The pad surface which faces away from the leak is reinforced by reinforcing which runs parallel to the right-angled sides.

By reason of the reinforcing which runs diagonally to the right-angled sides and which consists of reinforcing elements which bisect each other, the pad-surface which faces the leak is relatively elastic, that is, when filled with compressed air the surface can expand convexly, and in this way a good seal is achieved around the edges of a leak through close contact. The reinforcing itself nevertheless ensures that the surface of the pad is sufficiently rigid to allow the sealing-pad to be filled with air to nominal pressure when not inserted in a pipe or container and it will not burst. Moreover, the reinforcing prevents a localized convexing of the surface of the pad in the region of the area where the leak has occurred; this in its turn prevents damage of the pad-surface by any sharp edges which may be present around the leak.

By virtue of the reinforcing which runs parallel to the rectangular sides on the back of the surface which is turned away from the leak, the elasticity and amount of convex deformation of this surface is less, in contrast to that of the surface which is turned towards the leak. That is, on both surfaces of the pad the linear reinforcing material is in each case optimally employed, resulting in the surface turned towards the leak having the greatest possible expansion, which is to say convex deformation, and the surface turned away from the leak having the minimum amount of elasticity. In this way the sealing-pad developed in the terms of this invention will, if filled with air when not inserted in a pipe or container, not expand regularly; rather, the surface to be turned towards the leak will convex appreciably more than the surface which is not to be applied to the leak.

By virtue of the arrangement achieved in the reinforcings on both surfaces of the pad a favorable format is achieved with the use of as little material as possible. This results in low weight, improved flexibility of the whole pad and thus the ability to be employed on various shapes of walls which it may be necessary to seal, better sealing properties and a cheaper unit price on manufacture.

In further developments of the invention, it is proposed to reinforce the surface which is turned away from the leak with additional reinforcing. This reinforcing, additional to the reinforcing that is applied parallel to both rectangular sides, would be diagonally applied. In this way even greater rigidity of this surface of the pad would be achieved. At the same time, it would be possible in essence to construct the leak-sealing device of two sections: The one section, of ribbed material which is reinforced diagonally, would have a length that is not less than twice the total length of the leak sealing-device and a width which, leaving out of account the flanges which are to be bent over and down, would correspond essentially to the width of the rectangular pad. This section is folded twice at right angles to its length so that the end sections, which touch in the middle or even overlap, are sited in the vicinity of the pad-face that faces away from the leak. This face is then completed by a second section that has in essence the dimensions of the rectangular pad. Constructed thus, the first section forms an air-tight bladder that requires as few regions of contact (or union) as possible. The second section reinforces the overlapping region or, alternately, the region where the short sides of the first section touch. Such a leak sealing-device can be advantageously produced, it has a relatively light weight, it is by reason of its method of construction reliable and flexible in a transverse direction with respect to the faces of the pad. It may therefore be accommodated easily to various curvatures of walls.

In an improved model, the nipple is sited in a corner of the pad, the corner being, during inflation, less subject to stretching than the middle of one side of the pad. In the sealing-devices already available a nipple that is constructed as a valve is sited in the middle of the pad-surface which is turned away from the leak, that is, in the region subjected to the greatest deformation during inflation. If placed in the corner as is here proposed, the nipple would be more reliable when the pad is in operation, offer a secure seal over a longer period of time and, generally speaking, guarantee sufficiently comfortable access to the nipple.

It is further proposed to construct the attachment components as loops which project beyond the neighboring edge sections and are constructed from strips which are reinforced longitudinally. These strips will be pierced at both ends to form loops and be connected by vulcanization to the pad-surface which points away from the leak. By means of two such strips which are arranged with a space between them parallel to one of the rectangular sides, two loops will be formed on each of two edge areas opposite each other. The space remaining beside them will be filled out with rubber sections which are equally as thick so that the pad surface which points away from the leak will be smooth. Such attachments which are constructed as loops are flexible in the direction that is transverse to the direction of the reinforcing and can therefore accommodate themselves to the individual requirements when in use. The tensile forces are directly transferred from one loop to its opposite number, both being formed on the same strip; in this way the reinforcing on the face which is pointed away from the leak is subjected to less stress. Moreover, this type of construction saves weight, a factor which is advantageous with respect to the total weight of the leak sealing-device.

In addition, it is possible to construct the attachments in other ways: for example, metal pins which are inserted into opposite edges can be employed, as in already available models of the leak sealing-pad. For future models of this invention it is suggested that threads be tapped into the metal framework at the height of the pad and that hooks or the like be screwed in using these threads.

Finally, it is suggested in yet another alternative model that several bridges be mounted transverse to the direction of the tensioning devices on the top side of the pad-surface that points away from the leak. The tensioning devices will then be fed through between these bridges and the top side of the pad-surface which points away from the leak. The bridges merely secure the tensioning devices from being displaced to the side. The tensioning devices form a completely closed ring-loop around the container or pipe to be sealed off, and the pad-face which points away from the leak is thereby not--as in the types already discussed--employed as part of the closed loop of the tensioning devices. Rather, it itself is not stretched or pulled in the direction of the tensioning devices. Thus, the leak sealing-device can be constructed with a view to fulfilling its purpose better, which is sealing off leaks. In its construction it is no longer necessary to ensure that the leak sealing-device can absorb the tension forces. Thus the sealing-pad will weigh less, its flexibility laterally to the rectangular surface of the pad will be improved, and its manufacture will be simplified.

BRIEF DESCRIPTION OF THE DRAWINGS

Further positive features and characteristics of the invention result from the attached claims as well as from the following description of individual models or types of the invention, it being understood that these types and descriptions are not to be understood as exhaustive or limiting in any way. The types are explained more closely with reference to the drawings.

Of these.

DETAILED DESCRIPTION OF THE ILLUSTRATED EMBODIMENT

Figure 1:
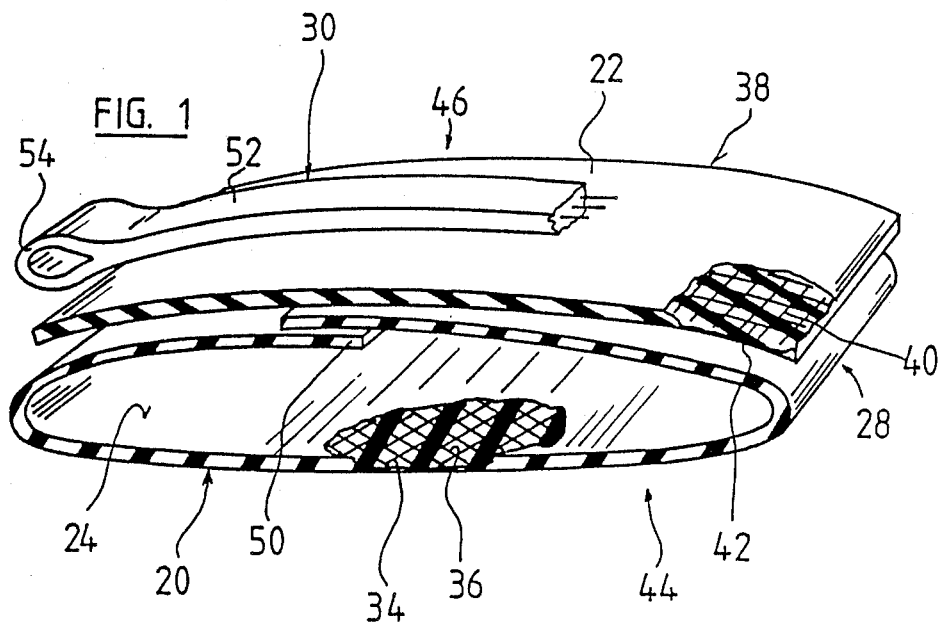
FIG. 1 shows in perspective the longitudinal section through a leak sealing-pad which is fitted with attachments in the form of loops which project beyond the edges.

The leak sealing-pad of the invention is constructed from reinforced, ribbed, non-vulcanized sections of rubber material. These sections are vulcanized in a press under heat and then form a leak sealing-pad that is rectangular in shape and that has a surface (20) which is applied to the leak and a surface (22) which faces away from the leak, both surfaces being equal in size. It is the purpose of the invention to construct these two surfaces (20) and (22) so that they are markedly different from each other and especially suited to the task which each must perform when a leak is to be sealed. The pad-surface which is applied to the leak (20) should be able when inflated to bulge convexly without hindrance so that any surface no matter what its shape or position can have pressure exerted uniformly around the region of a leak; this will result in a good seal. The pad-surface which points away from the leak should, when inflated, deform as little as possible. That is, it should form as rigid a support as possible so that the sealing-pad, when inflated, clings as closely as possible to the damaged wall and the minimum amount of air is required to inflate the sealing-pad.

Both the surfaces (20) and (22) form an air-tight inner chamber (24) which can be accessed externally via a nipple. Attachment components are located in the vicinity of two edge-zones which ar opposite each other, in general terms on the narrow sides (28) of the rectangle. These attachment components (30) are for those elements (32) cable, harness, chains or the like of a tension device. The tension device also displays tension attachments, for example a tackle device, a ratchet or the like, by means of which the tension elements can be pulled tight. When in use at least two tensioning devices are placed around the container or pipe which is to be sealed and pulled tight by means of the tensioning devices.

The pad-surfaces (20, 22) are reinforced by reinforcing strips (threads) (34, 36) which are mounted internally. These strips are flexible, spaced evenly, run parallel to one another and bisect one another (34, 36). For each surface (20, 22) the reinforcing threads which run parallel to one another are given a reference sign. The surface which points towards the leak is reinforced solely by the reinforcing elements (34) and (36). Both these groups of threads bisect each other at right-angles in the demonstrated example, but they may also bisect each other at any other angle, for example, 60°. The directions in which they run will be such that they form the greatest possible angle with respect to both the rectangular sides (28) and (38). This sealing-pad (20) has no further reinforcing. In contrast, the other surface has at least two bundles of reinforcing threads (40, 42) which run parallel to the rectangular sides (28, 38) and therefore bisect each other at right-angles. The pad-face which points away from the leak (22) can in addition be reinforced through reinforcing threads which run in the other direction. In the embodiment shown in FIG. 2, this is achieved by having the section which forms the surface facing the leak (20), and is therefore reinforced diagonally to the rectangular sides (28, 38), form at the same time the surface which faces away from the leak (22). Thus, this is reinforced not only by the reinforcing threads (40, 42), but also additionally by the reinforcing threads (34, 36) which run diagonally to them.

Figure 2:
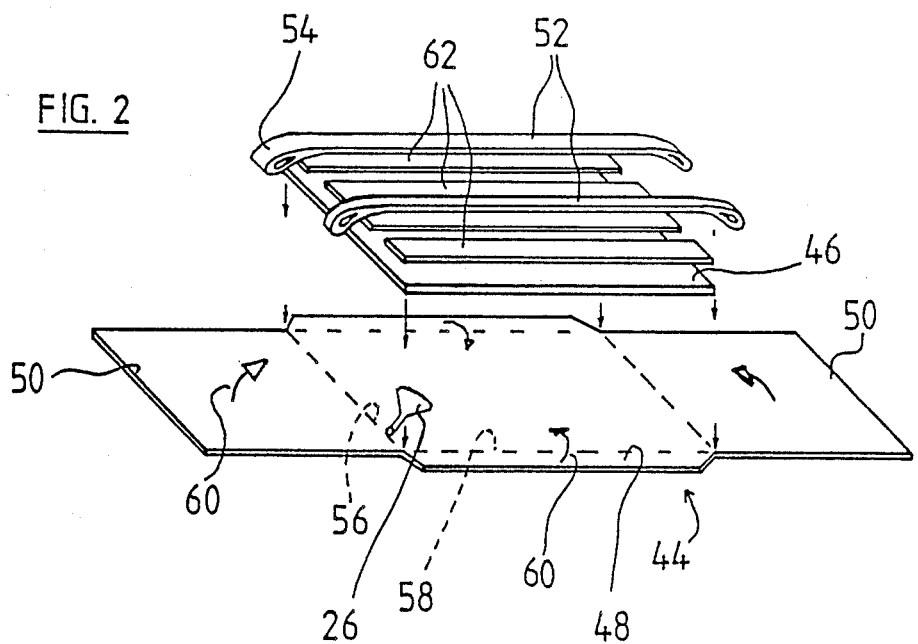
FIG. 2 shows in perspective an assembled sealing-pad constructed as outlined in FIG. 1.

The reinforcing threads (34, 36 and 40, 42) should have the following characteristics: longitudinally they should as far as possible not be extendible, but transverse to this they should be flexible. Preferred reinforcing strips are steel cord, that is, a highly flexible steel thread (cable) that is used in the tire industry, or polyamide, polyester, aramide or the like. The pad demonstrated in FIG. 2 is manufactured from a first section (34) which, essentially, is rectangular in shape and has diagonally sited reinforcing threads (34, 36), and also from a second, smaller rectangular section (46) whose reinforcing threads (40, 42) run parallel to the rectangular sides. The first section has a width which, essentially, corresponds to the width of the narrow side (28) and a length which is somewhat more than double the length of the side (38). In addition, as will be evident from FIG. 2, this section has side flaps (48) which are bent back to form an air-tight inner chamber (24) and joined through vulcanization to the opposite face of the pad. The second section has the dimensions of the rectangular surface of the pad. The first section is folded in such a way that the end sections (50) of its narrow sides overlap approximately in the middle of the face which points away from the leak. The second section (46) is sited outside of this overlapping region.

On the top side of this second section two flat strips (52) are mounted, only one being shown in FIG. 1. They are reinforced longitudinally and turned back at their ends in such a way that projecting loops (54) are formed opposite the narrow sides (28) of the pad. Each strip (52) forms two loops sited at the narrow sides opposite each other. These loops (54) serve as anchor elements for the tightening adjusting means (32).

The construction of such a leak-sealing device will be evident from FIG. 2. This figure shows the first section (44) which is folded together along the lines indicated by the dotted lines (56, 58) and in the directions of the arrows (60) to form a flat, pocket-like object. This forms in essence the airtight bladder, that is, the inner chamber (24). Its end sections (50) are, in contrast to the example illustrated in FIG. 1, calculated so that when they are folded together they touch exactly and concisely, thereby allowing no space between them but also no overlapping whatsoever. The second section (46) is placed above the unit so formed on the line where the two end sections (50) touch. This second section bears the decisive reinforcing of the pad-face which points away from the leak. Two strips (52), spaced and running parallel to the long side (38), are then placed on top of the second section. The space between these strips (52) and on the sides between these strips and the long sides (38) is filled with rubber strips (62) in such a way that when vulcanization is effected later the external surface of the face which points away from the leak (22) is as smooth as possible. The pad which is constructed in this way is then inflated with air and vulcanized in one single vulcanization process, whereby the individual parts are connected together in the familiar way. A nipple (26) is sited in one corner of the pad--its composition and arrangement is outlined in the European Patent Application No. 157 947.

Figure 3:
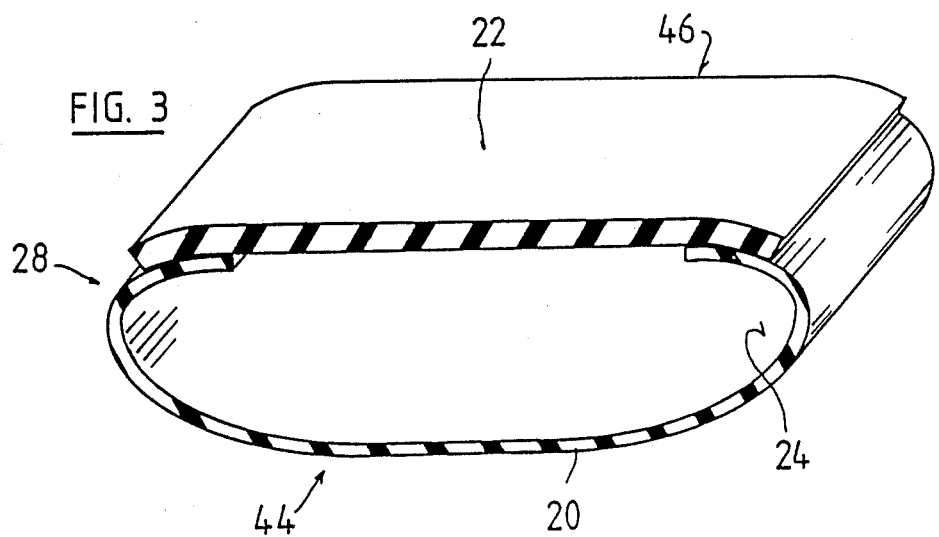
FIG. 3 shows in perspective the representation of a sealing-pad transversely bisected.
Figure 4:
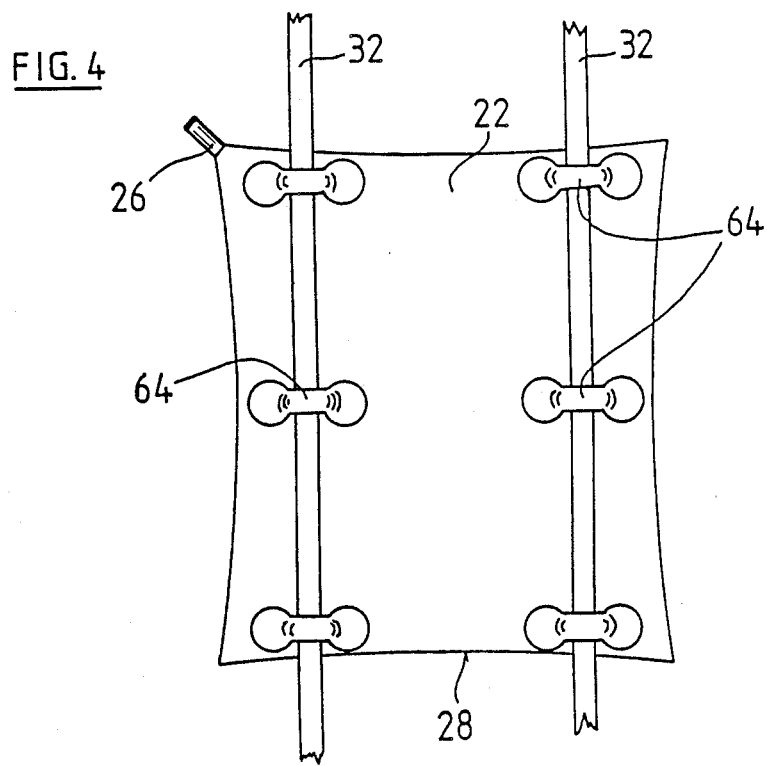
FIG. 4 shows the plan of the pad-face that faces away from the leak. It is fitted with bridges for guiding the tensioning devices, these devices being constructed as a rope.

FIG. 3 shows a different development of the sealing-pad. Here the first section (44) has, in essence, the size of one surface of the pad, and for all practical purposes it forms by itself the pad-surface which points to the leak. On all four rectangular sides it has projecting flaps like the flaps shown (48), and by means of these flaps it is joined to the second section (46). This second section has in its turn the size and shape of the pad rectangle. The inner chamber (24) is formed between both these sections (44 and 46) which at the same time form the two faces of the pad.

In all, 6 bridges (64) will be mounted in a completed model according to drawing 4. These bridges are mounted outside on the surface of the surface which is turned away from the leak (22) and run transversely to the direction of pull of the traction devices (32). Together, they form a path, that is a track for one of the traction elements shown in the drawing as a cable pulling attachment (32). It is their purpose to ensure that the pulling attachment does not slip off to one side. The traction device (32) can nevertheless move longitudinally relative to the face of the pad (22), the pad itself not being subject to any tension or pull. The bridges (64) can also be constructed as rings which are held on the face of the pad which points away from the leak (22). It is also possible to construct other types than that shown in the drawing. Decisive for the bridges is merely that they prevent the traction elements (32) from slipping sideways and thus slipping off the face of the pad (22). Their job is then to ensure free longitudinal movement of these traction elements.

I claim:

1. In a sealing pad for sealing of damaged walls of containers and pipes exhibiting a leak which pad is manufactured from reinforced sections of rubber which prior to vulcanization is not vulcanized, said sections being joined by vulcanization in a press under heat, and form an air-tight inner chamber, a nipple being provided for having access to this inner chamber, said sealing pad being rectangular in shape, defining right-angled sides and having a pad-surface facing towards the leak and a pad-surface which faces away from the leak, both pad-surfaces having the same size and a rectangular shape, with the sealing pad also having on two opposite sides attachment components for a device for applying tension that encompasses the containers or pipes, wherein both the pad-surfaces are reinforced internally with flexible, linear reinforcing elements which bisect each other, the pad surface which is placed against the leak is reinforced solely with reinforcing elements which lie obliquely to the right-angled sides of the sealing pad, and the pad-surface which faces away from the leak has reinforcing elements which run parallel to the right-angled sides of the sealing pad.

2. A leak sealing-pad according to claim 1, wherein the reinforcing elements of the pad-surface which is placed against the leak cross each other at right angles and encompass the greatest possible angles to the two right-angled sides of the sealing pad.

3. A leak sealing-pad according to claim 1, wherein the reinforcing elements of the pad-surface which is placed against the leak are mounted diagonally.

4. A lead sealing-pad according to claim 1, wherein the pad surface which faces away from the leak is, additional to the reinforcing elements running parallel to the right-angled sides of the sealing pad, reinforced with elements mounted diagonally to the said right-angled sides of the sealing pad.

5. A leak sealing-pad according to claim 1, wherein the sealing-pad has two narrow sides and two long sides, the sealing pad is manufactured from a first section which, essentially, is rectangular in shape, is as broad as the length of the narrow sides and is at least as long as twice the length of the long sides, and from a second section which is also rectangular in shape and has dimensions corresponding to the right-angled sides.

6. A leak sealing-pad according to claim 5, wherein the attachment components are constructed as loops which project opposite the narrow sides and are constructed of thin, reinforced strips which are connected to the pad-surface which faces away from the leak.

7. A leak sealing-pad according to claim 1, wherein traction elements are provided end bridges are mounted outside on the pad-surface which faces away from the leak, several of said bridges overspanning each of the traction elements to ensure that the traction elements can move longitudinally but do not slip off to one side.

8. A leak sealing-pad according to claim 1, wherein the nipple is mounted in a corner of the inner chamber.

* * * * *